Aug. 17, 1965   G. PEREZ ETAL   3,201,570
RECORD SENSING AND FEEDING APPARATUS
Filed Dec. 27, 1961   3 Sheets-Sheet 1

INVENTORS
GUILLERMO PEREZ
LEON GRYK

BY Thomas S. Ross
Joseph R. Spalla
ATTORNEYS

Aug. 17, 1965
G. PEREZ ETAL
3,201,570
RECORD SENSING AND FEEDING APPARATUS
Filed Dec. 27, 1961
3 Sheets-Sheet 2
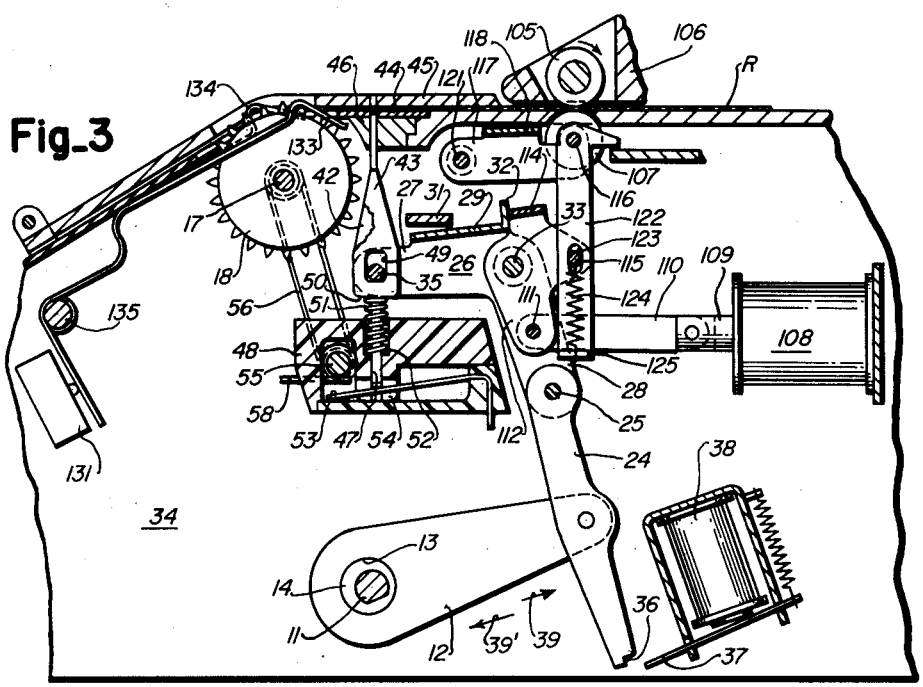
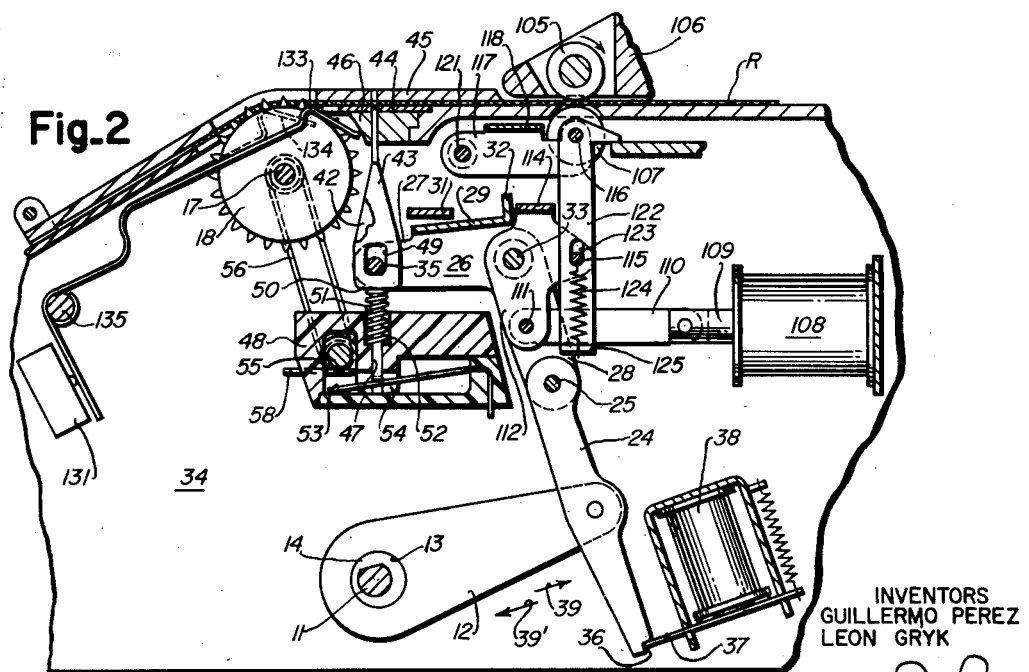
INVENTORS
GUILLERMO PEREZ
LEON GRYK
BY Thomas S. Rose
Joseph R. Spalla
ATTORNEYS

United States Patent Office 3,201,570
Patented Aug. 17, 1965

3,201,570
RECORD SENSING AND FEEDING APPARATUS
Guillermo Perez, Bristol, and Leon Gryk, New Britain,
Conn., assignors to Royal McBee Corporation, New
York, N.Y., a corporation of New York
Filed Dec. 27, 1961, Ser. No. 162,388
7 Claims. (Cl. 235—61.11)

This invention relates to record sensing and feeding apparatus; more particularly it relates to a perforated record sensing and feeding apparatus including circuitry to effect read-feed cycles in response to command signals of the type employing mechanically operated record sensing pins; and specifically it relates to an apparatus of the aforesaid type characterized by the intimate association therewith of an auxiliary record drive apparatus whereby records may be automatically introduced into the apparatus for processing thereby.

In apparatus of the aforesaid type, record sensing pins are normally biased into a record channel in order to sense the columnar hole patterns in a record being processed therethrough and are retractable to enable columnar movement of the record through said channel after each sensing interval by a feed sprocket downstream of the sensing pins. In that the feed sprocket is so positioned downstream of the sensing pins the insertion of a new record into the apparatus for processing has heretofore necessitated the manipulation of record hold down devices forming the upper surface of the record channel to permit the new record to be placed into operative engagement with the feed drum without impediment by the pins normally biased into the record channel. This manipulation is a time consuming and tiresome procedure particularly when a great number of record cards or tapes are to be processed.

In accordance with the invention the apparatus is operable through read-feed cycles under the control of circuitry responsive to command signals and to timing signals generated by the apparatus at a cyclic rate whereby the operation of the sensing and feeding apparatus occurs at the command rate. This circuitry for controlling the record sensing and feeding apparatus is also responsive to record position detecting means such that when no record is in the apparatus the retraction of the sensing pins and the operation of an auxiliary feed mechanism upstream of the sensing pins is effected whereby a record may be automatically fed past the retracted sensing pins and into engagement with the feed drum without manipulation or disturbance of record hold down structure.

An object of the invention resides in the provision of record sensing and feeding apparatus having in combination therewith auxiliary feed mechanism and means operable in response to the absence of a record to effect the operation of said apparatus and mechanism thereby to automatically position a new record in the apparatus for processing.

Another object of the invention is to provide, in combination with record sensing and feeding apparatus, auxiliary feed mechanism and record position responsive means operable when no record is in said apparatus to disable said apparatus and to enable said mechanism thereby to permit the automatic insertion of perforated records into said apparatus for processing thereby.

Another object of the invention is to provide with a record sensing and feeding apparatus operable under control of circuitry responsive to command signals, apparatus for rendering said command signals ineffective and an auxiliary feed mechanism effective, whereby a perforated record may be automatically positioned in the record sensing apparatus after a record previously inserted has been processed.

Still another object of the invention is in the provision in a record sensing apparatus employing mechanically operated sensing pins, of apparatus operable to automatically retract said pins from a record channel after a record in the appparatus has been processed to enable the insertion of a new record.

A further object of the invention resides in the provision of a perforated record sensing apparatus of the aforesaid type operable after a record has been processed to effect the retraction of sensing pins and to simultaneously effect the operation of an auxiliary record drive mechanism wherein the latter mechanism serves to maintain said pins retracted until a record has been inserted in and positioned for processing.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURES 2 and 3 are views similar to FIGURE 1 showing the active positions of the elements during a feed interval and conditioned for automatic record insertion respectively;

Figure 1:
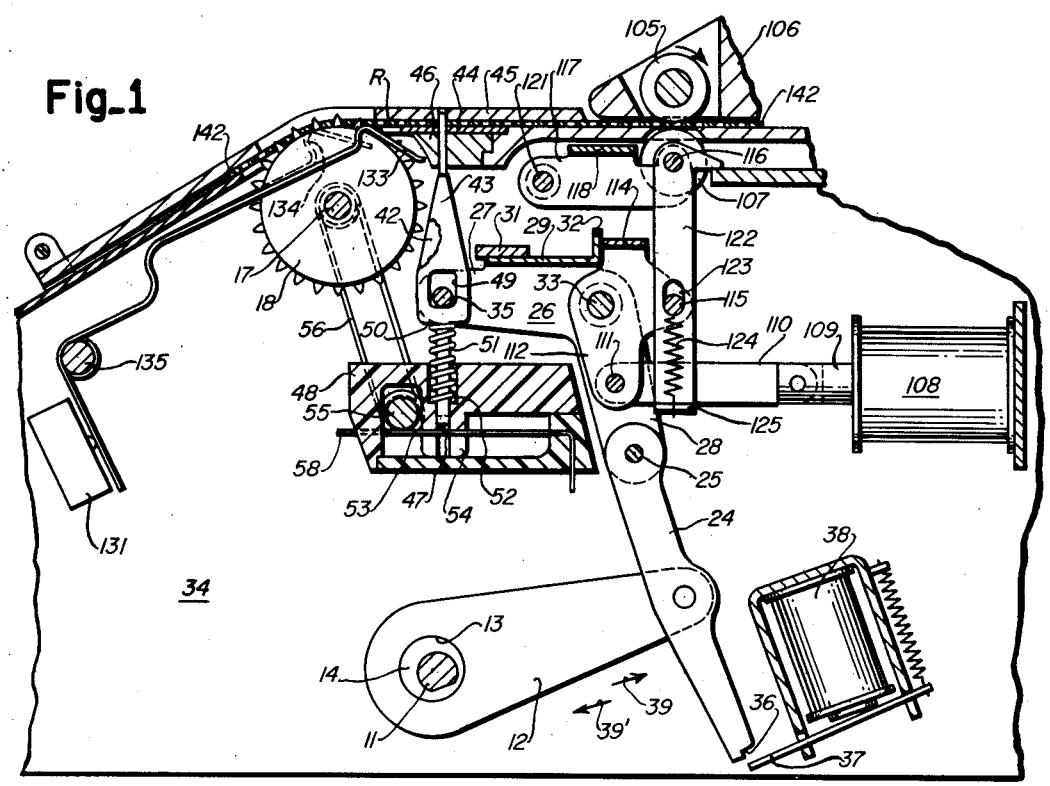
FIGURE 1 is an elevational view of record sensing and feeding apparatus including auxiliary feed mechanism in accordance with the invention showing the position of the elements during a record sensing interval.

Referring now to the drawings there is shown in FIGURE 1 a shaft 11 adapted to be continuously driven at a constant speed from a suitable motive source (not shown). A sensing pin drive arm 12 is provided with a circular cutout 13 adjacent one end which receives a circular cam 14 eccentrically mounted on shaft 11 whereby for each rotary cycle of shaft 11, arm 12 will be oscillated in a substantially lateral direction. The shaft 11 also carries a similar cam and drive arm associated with tape feed mechanism (not shown) including forward and reverse feed solenoids 15 and 16 (FIGURE 7) whereby the shaft 17 of a tape feed sprocket 18 may be incrementally rotated in forward or reverse directions in timed relation to a sensing operation. The tape feed mechanism is preferably that disclosed and claimed in copending application Serial No. 36,531 now Patent 3,036,474.

Figure 7:
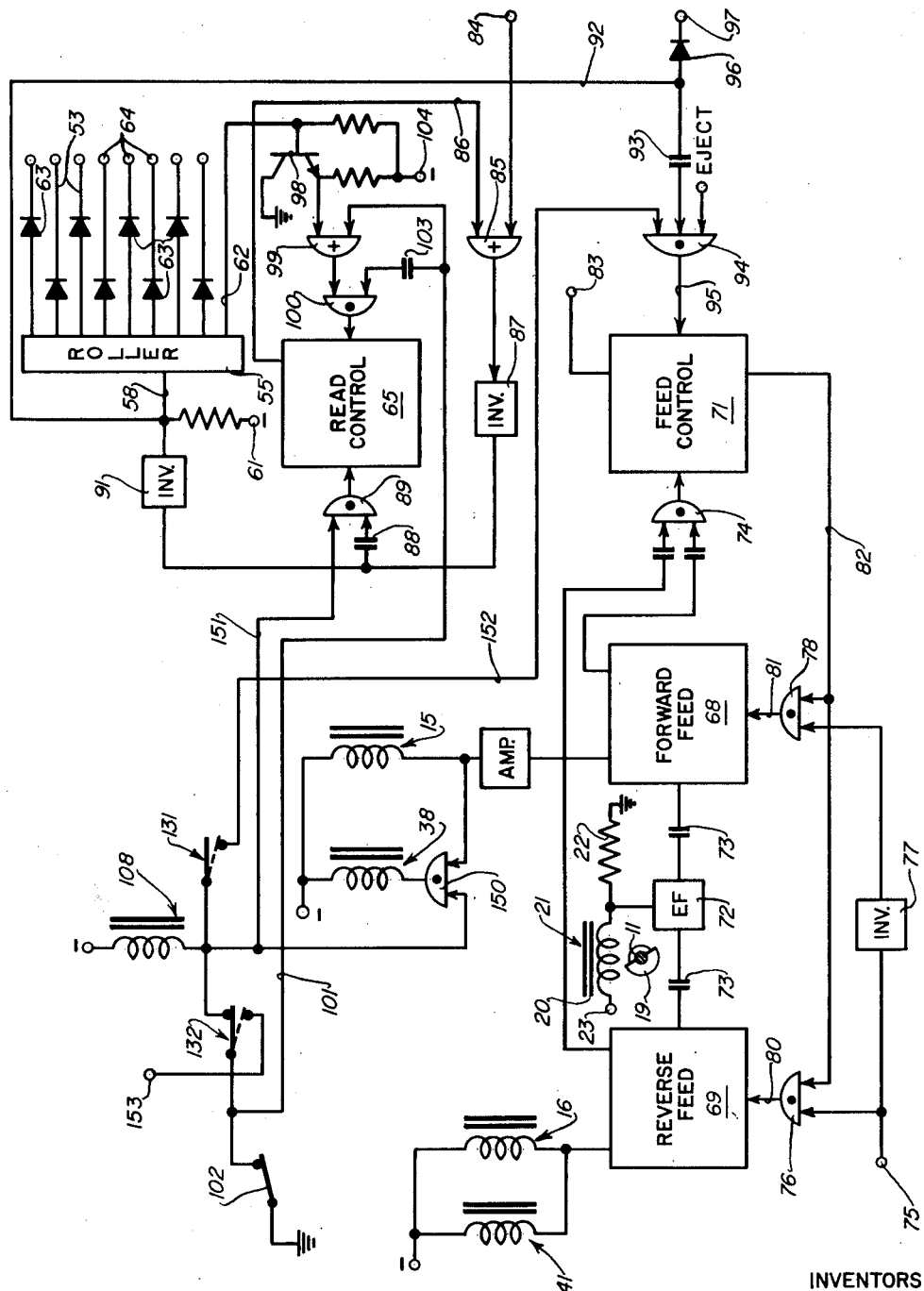
FIGURE 7 is a block schematic diagram of the apparatus control circuitry.

As shown in FIGURE 7 the shaft 11 also carries a semicircular element 19 operatively associated with the core 20 of an electromagnet 21. The coil of the electromagnet is connected in series with a resistor 22 and both are connected between ground and a direct current terminal source 23. As is understood in the art element 19 will act to concentrate and diminish the flux in the electromagnet core 20 every cycle of shaft 11 thereby inducing positive and negative timing pulses in the coil circuit at the shaft rate.

The other end of the drive arm 12 is articulately connected to and between the ends of a substantially vertically oriented lever arm 24, the upper end of which is articulately connected to a cross shaft 25 associated with a control element generally designated by reference numeral 26. The control element comprises spaced generally V-shaped, arms each defined by a lateral leg 27 extending toward the left as viewed in FIGURES 1–3 and a leg 28 depending angularly therefrom toward the right. The arms are connected in spaced relation by a cross piece 29 which is secured to or integrally formed with the upper edges of the laterally extending legs 27. The cross piece 29 normally abuts a clockwise motion limiting stop 31 under the influence of a control element biasing spring (not shown), and also under the influence of springs associated with sensing pins as will hereinafter appear. The cross piece is also provided with an upwardly extending flange 32 for reasons which will hereinafter be apparent. The vertices of the V-shaped arms are pivoted on a cross shaft 33 secured to the machine frame 34. The extremities of the lateral and depending legs respectively carry a cross shaft 35 and the cross shaft 25. As stated above the lever arm 24 is articulately connected to cross shaft 25 and normally oscillates about shaft 25 in response to the oscillating drive arm 12. The lower free extremity of the lever arm 24 is provided with a notch 36 which is adapted to be engaged by an interposer comprising the armature 37 of a pin retracting solenoid 38 upon energization of the latter which occurs during forward feed operation. With the armature 37 interposed into the notch during the forward stroke 39 of the oscillating drive arm 12, the lever arm 24 will be caused to pivot about the notch 36 and thereby cause the control element 26 to rotate counterclockwise about pivot shaft 33.

A cam, drive arm, and a lever arm (not shown), and a solenoid 41 (FIGURE 7) similar to elements 14, 12 and 24 except that the cam is 180 degrees out of phase with cam 14 are provided to operate control element 26 during reverse feed operation.

As seen in FIGURES 1–3 data sensing pins 42 and an index pin 43 of light plastic material are supported for vertical movement into and out of a record channel defined by a horizontally disposed die plate 44 and a spaced horizontally disposed hold down plate 45 which is pivotally mounted for movement away from die plate 44 for servicing the apparatus. The upper extremities of the pins, which have a restricted diameter to permit their movement into perforation patterns in a record moving through the channel are guidingly received in the holes in a frame supported die block 46 to which the die plate is secured; the column of holes therein being aligned with the holes in the die block 46. The lower extremities of the pins are guidingly received in holes 47 in an insulating block 48 secured to the machine frame 34. The intermediate portions of the sensing pins 42 and index pin 43 are relatively larger than the extremities and are provided with slots 49 whereby the pins may be mounted on and for movement relative to the cross shaft 35 secured between the control element legs 27. The relatively wider intermediate portions of the pins form annular shoulders 50 adapted to be engaged by the upper ends of coiled springs 51 surrounding the lower extremities of the pins. The lower ends of springs 51 are supported by annular shoulders 52 formed by the enlargement of the uppermost portions of the holes 47 in the insulating block. The normal lengths of the spring 51 are such that the pins are biased against the cross shaft 35 and into the record channel as shown in FIGURE 1 which is the normal sensing position. In order to feed a record the pins must be retracted and this occurs upon counterclockwise rotation of the control element 26 under the action of link 24 when the solenoid 38 is energized. When the pins are retracted to permit movement of a record their lower extremities are adapted to engage and depress associated spring contacts 53, which are guided by a comb 54, to cause them to break contact with a common contact 55. The common contact is mounted for rotation in the insulating block and driven by a belt connection 56 to the record feed sprocket shaft 17 whereby it is incrementally rotated to present a new contact surface after each sensing operation. During the interval the pins are retracted the record will be fed columnwise by the tape feed mechanism to present the next perforation pattern in the record opposite the sensing pins. Toward the end of the feed interval with the arm 12 moving leftwardly away from interposer 37, the pins are released for movement by associated springs such that those pins opposite perforations will rise and associated contacts will "make" while those pins opposite imperforate areas will be prevented from rising by those imperforate areas in the record to an extent such that their associated contacts will not "make." The force of the springs 51 associated with pins opposite perforations, through engagement of the lower boundary of the slots 49 with the cross shaft 35, acts in concert with the control element biasing spring to return the control element 26 to its normal position. The force of the springs associated with pins opposite imperforate areas coupled with the low mass of the pins is not sufficient however to perforate or tear the record. For reasons which will hereinafter appear the index pin 43 similarly operates an associated contact which "makes" later and "breaks" sooner than the data contacts 53 due to the extra length of the lower extremity of the index pin.

The mechanism above described is associated with control circuitry which functions in response to external command signals, to the interrogate pulses generated by the breaking and making of the contact associated with the index pin, and to the shaft generated timing pulses, to simultaneously energize and de-energize the forward or reverse feed and pin solenoids whereby information from the record is sensed and the record fed by the apparatus at the command signal rate.

With particular reference to FIGURE 7 there is schematically shown said reader control circuitry including the common contact 55 which is always connected via a brush contact 58 to a negative source terminal 61. Also as hereinbefore noted the data contacts 53 and the index pin or interrogate contact 62 ride the surface of the common roller contact. The data contacts are connected via diodes 63 poled to pass positive pulses to output terminals 64. The interrogate contact 62 is connected, as will hereinafter be more fully explained, in a circuit adapted to effect the resetting of a reader control flip flop 65. Also shown in FIGURE 7 are the forward and reverse pin retracting and feed magnets 38 and 41, and 15 and 16 respectively controlled by associated feed flip flops 68 and 69 and a feed control flip flop 71. In the static state all of the flip flops are in a reset state.

Each of the flip flops as well as the "and" and "or" circuits shown are of conventional construction and preferably employ transistors. As is understood in the art a flip flop is a bistable device from which two output signal conditions, e.g. plus and minus voltage levels may be simultaneously derived, which output signal conditions reverse when the devices switch state. Switching back and forth from one stable state to the other, i.e. from reset to set states, is accomplished, either by alternately applying to one of the two inputs of such a device, signals of alternating polarity, or to both inputs alternately, signals of the same polarity. In accordance with the invention the forward feed flip flop 68, when not clamped in a reset state, is adapted to be set and reset by the negative and positive timing pulses generated each shaft cycle, while the reverse feed flip flop is adapted to be set and reset by the positive and negative pulses. As shown in FIGURE 7 the timing pulses drive an emitter follower 72 whose output is A.C. coupled by capacitors 73 to the input terminals of the feed flip flops 68 and 69. The pin retracting and feed magnets are connected to the output of their associated flip flops which when the flip flops are set will cause the magnets to be energized. The other output terminals of the feed flip flops 68 and 69 are A.C. coupled to an "or" circuit 74 whose output is connected to one of the inputs of the feed control flip flop 71 such that when a feed flip flop 68 or 69, as the case may be, is reset, the feed control flip flop 71 will also be reset.

One or the other of the feed flops 68 and 69 is clamped in a reset state depending on the polarity of a signal on terminal 75 which is connected directly to an "or" circuit 76 and indirectly through a signal inverter 77 to an "or"

circuit 78. The output lines 80 and 81 respectively of the "or" circuits 76 and 78 are connected to the reverse and forward feed flip flops 68 and 69 whereby depending on the polarity of the signal on terminal 75 one or the other of flip flops 68 and 69 will be clamped in its reset or static state. The feed flip flops 68 and 69 are also clamped in a reset state by the signal condition on one of the outputs of the feed control flip flop 71 which is connected over line 82 to the inputs of the "or" circuits 76 and 78. The other output of the feed control flip flop is connected to an output terminal 83 whereby when the feed control flip flop 71 is set the signal on terminal 83 will indicate that the reader is in process.

The signals from a system with which the reader is to function are applied to an input terminal 84 which is connected to an "and" circuit 85 as is a line 86 from one of the outputs of the read control flip flop 65. The polarity of the signal on line 86 when flip flop 65 is in its set state is such that the "and" circuit 85 is blocked. However, since the normal state of flip flop 65 is the reset state the "and" circuit 85 is conditioned to pass a positive start signal on terminal 84. The output of the "and" gate 85 is connected to an inverter or amplifier 87 whose output is a A.C. coupled by condensor 88 and an "or" circuit 89 to one input terminal of flip flop 65 in order that the positive going trailing edge of the inverted start signal will be effective to set flip flop 65. The output of amplifier 87 is also connected directly to an amplifier 91 wherein it is reinverted and applied to the common brush contact 58 thereby overcoming the bias of source 61 on the diodes 63 associated with the data contacts whose associated pins extend through perforations in a tape or record R being read and for as long as the signal on terminal 84 persists.

The output of the inverter 91 is also A.C. coupled over line 92 and condensor 93 to one of the inputs of an "or" circuit 94 having its output 95 connected to the input of the feed control flip flop 71 whereby the leading edge of the positive pulse will set flip flop 71. Also the signal on line 92 is connected via a properly poled diode 96 to an output terminal 97 which tells the system with which the reader is to function that the information sensed is on terminals 64.

As shown the interrogate contact 62 is connected to the base of an NPN transistor emitter follower 98 whose output is connected via an "and" circuit 99 whose output in turn is connected through an "or" circuit 100 to the reset terminal of the read control flip flop 65. A line 101 from a tape tension switch 102 which is normally in the position shown when a tape record is not under tension or a card record is being processed is A.C. coupled by a condensor 103 to the "or" circuit 100 and directly coupled to the "an" circuit 99. The bias source 104 to which the emitter and base of transistor 98 is connected is more negative than source 61.

In operation then, with all the flip flops in a reset state and the data pins 42 biased toward the record R, those pins opposite perforations in the record will extend through the perforations, and associated contacts 53 will be closed. The application of a start pulse on terminal 84 will effect the energization of the data terminals 64 associated with pins in perforations, and the energization of terminal 97 for as long as the start pulse is present. Also the leading edge of the start pulse will set the feed control flip flop 71 whereby its clamping voltage on line 82 will be removed from the feed flip flops 68 and 69 such that the one not clamped by the signal on terminal 75 e.g. the forward feed flip flop 69, will no longer be clamped in the reset state. In this unclamped state the application of a negative set pulse from emitter follower 72 to the input of flip flop 69 will switch it to its set state and effect the energization of the forward pin retracting feed magnets 38 and 15 whereby the record R may be indexed.

The duration of the start or command pulse on terminal 84 will normally be such that feeding will occur after its termination, such that the read control flip flop 65 will have been set by the trailing edge thereof. It is to be here noted that prior to the setting of the read control flip flop 65 the application of the positive start pulse to the reset terminal of flip flop 65 via the index or interrogate contact 62 will have no effect on the flip flop 65 as it is then in its reset state. The termination of the start pulse will cause the interrogate contact to reassume the negative potential of source 61 but, since this will coincide with the setting of the flip flop 65, the negative pulse will have no switching effect on the flip flop 65. When the pins are retracted the interrogate contact will open driving the base of the emitter follower 98 further negative, i.e., to that of source 104 with no effect. When, after the tape has been indexed and the pins rise to sense the new perforation pattern, the interrogate contact remakes and the reapplication of the negtive source 61 to the base of the emitter follower 98 will cause the base potential to swing positive by the difference between sources 61 and 104. The resulting positive going pulse will reset the read control flip flop 65 thereby opening the "and" gate 85 to permit the passage of another start pulse and thereby effect another read feed cycle.

A reverse read-feed cycle operates as above except that the polarity of the signal on terminal 75 is reversed and the reverse flip flop is set and reset by positive and negative timing pulses such that synchronization to the mechanical cycle is 180 degrees removed from what it was in forward.

Similarly record movement (forward or reverse) without reading may be accomplished simply by directly applying a positive signal to the "or" circuit 94, via a terminal labelled Eject (FIGURE 7), which will set and maintain the feed control flip flop 71 set until the signal is removed.

Referring again to FIGURES 1–3 the auxiliary record drive mechanism whereby records may be automatically introduced into the record sensing apparatus for processing comprises a continuously driven friction roller 105 which is mounted for rotation in an element 106 having a record guide track formed therein. Element 106 is secured to the machine frame upstream of the pin sensing station. Roller 105 is preferably drivingly coupled to the power shaft 11 by a belt or other suitable means (not shown). A second roller 107 normally spaced from and below roller 105 is adapted to be moved upwardly toward roller 105 upon energization of an auxiliary feed solenoid 108. Solenoid 108 is provided with an armature 109 which is connected by a link 110 to a cross shaft 111 associated with a roller control element generally designated by reference 112. The control element 112 comprises horizontally spaced arms connected by a cross piece 114 adapted as will be apparent hereinafter to cooperate with the flange 32 of the pin control element 26. Control element 112 is pivoted on shaft 33 and its arms carry between them cross shaft 111 and a cross shaft 115. As shown in FIGURES 1–3 the second roller 107 is rotatably mounted on a cross shaft 116 which is carried between spaced arms 117 connected by a cross piece 118. The arms are pivotally mounted on a cross shaft 121 which is secured to the machine frame. A vertically oriented lever 122 is articulately connected at its upper end to the cross shaft 116 and is formed with a vertical slot 123 intermediate its ends to accommodate the cross shaft 115 which, in the positions shown in FIGURES 1 and 2, maintains the lever 122 depressed and thereby maintains the friction roller 107 away from roller 105. A follower spring 124 secured between cross shaft 115 and an ear 125 formed on the lower extremity of lever 122 serves, when control element 112 is moved counterclockwise by the action of the solenoid 108, to transmit the motion of control element 112 to lever 122 thereby to move roller 107 toward but short of engagement with roller 105.

Figure 4:
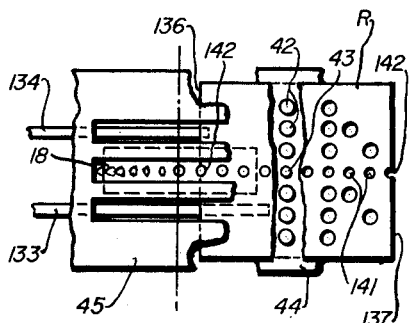
FIGURE 4 is a top view of the record feed sprocket and switch arms.

The hereinbefore described control circuitry functions in a manner hereinafter to be described in response to automatic feed and record in position micro-switches 131 and 132 respectively. These switches are operable respectively by resilient switch arms 133 and 134 responsive to the presence and absence of a record R in the record sensing apparatus. As shown in FIGURES 1–3 the switch arms are pivoted downstream of the feed sprocket as at 135; the ends of the switch arms adjacent the pivot being adapted to operate associated microswitches. The other ends of the switch arms extend from the pivot to either side of the feed sprocket 18 which as shown in FIGURE 4 is relatively narrower than a record card or tape R to be processed.

Figure 5:
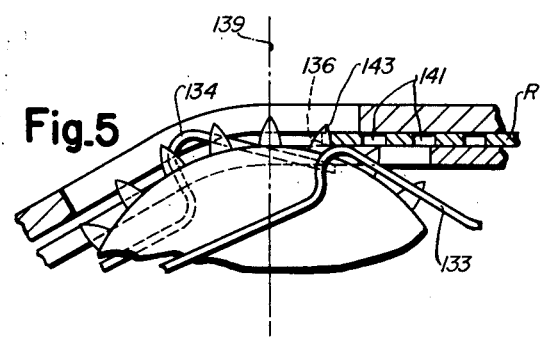
FIGURES 5 and 6 are fragmentary cross sectional views showing more clearly the operative association of records and the switch arms operative thereby.
Figure 6:
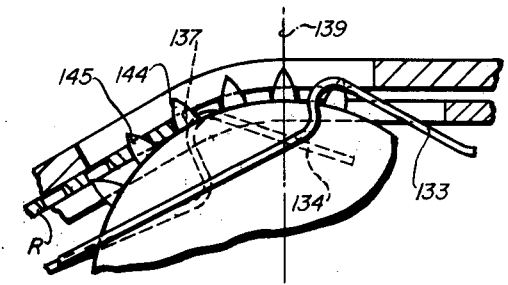

As shown more clearly in FIGURES 5 and 6 the switch arms 133 and 134 have crooks formed in the ends adjacent the feed sprocket 18, which are so formed and oriented that the switch arms will be gradually depressed when encountered by the forward edge 136 of a record and quickly released upon movement of the terminal edge 137 of a record therebeyond. More particularly the crook in switch arm 133 occupies a position upstream of a vertical 139 through the sprocket shaft and the bend in switch arm 134 occupies a position downstream of the vertical line. The normal state of the switch arms are as shown in FIGURE 3 which state obtains when no record is being processed. It is to be here noted that the index holes 141 in the records R employed with the instant apparatus extend to the terminal edges of the records with the terminal edges having half an index hole 142 perforated therein. The switch arms 133 and 134 are sufficiently depressed by the forward edge 136 of a record to transfer the switches associated therewith when the half feed hole 142 in the forward edge of the record engages the sprocket pin 143 then one increment upstream from center, in the case of switch arm 133 (FIGURE 5) and, in the case of switch arm 134 when the pin 143 is positioned downstream from center, which for the particular geometry of parts shown is two increments. Hence three feed increments occur between the operation of switches 131 and 132.

Similarly the switch arms 133 and 134 are released to normal position to effect associated switch transfers when a pin 144 one increment upstream of center, and drivingly engaging the half feed hole in the terminal edge 137 of a record, is moving to the center position in the case of switch arm 133; and in the case of switch arm 134 when said pin 144 has been indexed a sufficient number of increments downstream of center to assure that its preceding sprocket pin 145 is no longer engaging the record, which for the geometry of parts illustrated is three increments. This may be seen to be true from FIGURE 6 which shows said pin 144 two increments removed from center with the record edge 137 still maintaining switch arm 134 depressed. A subsequent incremental movement therefrom will release switch arm 134 and cause pin 145 to clear the record; the terminal half feed hole permitting unimpeded removal of the record after feed stops which event occurs when the in position switch 132 transfers as will hereinafter appear. As shown in FIGURE 7 the automatic feed and in position switches 131 and 132 respectively are connected to control the energization of the auxiliary feed magnet and the forward feed and pin retracting magnets. The solid line position of the movable contacts of the switches 131 and 132 represents the normal i.e. the position they assume when no record is being processed, and the dotted line position of the movable contacts the other than normal position i.e. the position they assume when a record is being processed as illustrated in FIGURES 1 and 2. As seen in FIGURE 7 the movable contact of the in position switch 132 is adapted when in its normal position to supply a positive or ground potential, if the tape tension switch 102 is normal, to one side of the auxiliary feed magnet 108, to one side of the forward pin retracting magnet 38 through an "or" circuit 150, and also over line 151 to the "or" circuit 89 whereby flip flop 65 will be set and held in set condition and thereby block the "and" circuit 85. When the in position switch 132 is in its normal position and the auto feed switch 131 is in its other than normal position a positive potential will also be applied over line 152 and through "or" circuit 94 whereby under this set of conditions the feed control flip flop 71 will be set. When the in position switch 132 is in its other than normal position ground is applied to an eject complete or record in position terminal 153 which tells a system of this fact. When both switches 131 and 132 are in their other than normal position (dotted line) they have no effect on the normal operation of the circuitry which as hereinbefore explained is responsive to command signals to effect the energization of the feed and pin retracting solenoids at the command signal rate whereby sensing (FIGURE 1) and feeding (FIGURE 2) occur in timed relationship under control of associated cams and solenoids.

The operation of the above described mechanism and auxiliary record drive apparatus is as follows: When the terminal edge 137 of a record R being processed feeds past the bend of switch arm 133 the movable contact of the switch 131 associated therewith transfers to its normal position; the circuitry however remains unaffected and feed cycles in response to command signals continue until the terminal edge of the record releases arm 134 and effects the transfer of switch 132 to its normal position. The transfer of switch 132 to normal effects the energization of the auxiliary drive solenoid 108 and provides a parallel energizing circuit for the pin solenoid 38 which therefore will remain energized after the feed interval during which the transfer of switch 132 is completed. The transfer of switch 132 also sets flip flop 65 whereby a subsequent command signal will be ineffective to energize data terminals 64 or to effect the setting of the feed control flip flop 71 over line 92. Since the pin retracting solenoid 38 is energized when solenoid 108 is energized the latter need only move the roller control element 112 to effect movement of roller 107 toward 105 as shown in FIGURE 3 which illustrates the position of the elements prior to the introduction of a new record. It is to be noted also in FIGURE 3 that cross piece 114 abuts flange 32 on the pin control element 26 thereby maintaining the latter element in its counterclockwise position whereby the pins will remain retracted during the intervals the pin control arm 12 is moving away from the energized pin magnet 38 as indicated by arrow 39' (FIGURE 1).

Placing a new record card or tape R between closely spaced but separated rollers 105 and 107 will frictionally drive the record until its forward edge 136 encounters switch arm 133 thereby effecting the transfer of the switch 131 associated therewith to its other than normal (dotted line) position. And because switch 132 is normal the feed control flip flop 71 will be set over line 152 thereby conditioning the forward feed flip flop 69 whereby it can be set and reset by the timing pulses thereby to energize the forward feed magnet which effects indexing of the record feed sprocket three increments; whereupon the forward edge 136 of the record will effect the transfer of switch 132 which effects the de-energization of the drive solenoid 108, opens the parallel energizing circuit of the pin solenoid 38, and removes the positive potential from flip flop 71 whereby the feed flip flop 69 will be disabled after flip flop 71 is reset by the resetting of the feed flip flop 69. It is to be here noted that the friction rollers 105 and 107 slip on the upstream portion of the record between the feed intervals before switch 132 transfers; the friction drive causing the record to follow pin 143 during the drive intervals before switch 132 transfers. After the switch 132 transfers the new record may read on command as hereinbefore described.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. The combination with record reading apparatus comprising cyclically operable drive means,
   record sensing and feeding mechanism,
   control means operable in response to command signals to effect the connection of said drive means with said sensing and feeding mechanism whereby an operatively positioned record may be successively sensed and fed,
   of normally inoperative record drive means,
   first and second switch means serially operative from a first to a second position in response to the passage of the terminal edge of a record from engagement with said feeding mechanism,
   means responsive to the operation of said second switch means for rendering said control means non-responsive to said command signals and for enabling said record drive means, said first switch means being serially operative back to its first position in response to the engagement with said feeding mechanism of the forward edge of a new record,
   and means responsive to the return of said first switch means to its first position for enabling said feeding mechanism whereby said new record is fed thereby until said second switch means is returned to its first position by the forward edge of said new record,
   the return of said second switch means disabling said record drive means and said feeding mechanism and rendering said control means responsive to subsequent command signals thereby to permit subsequent read-feed cycles.

2. Record processing apparatus having record sensing elements normally biased into a record channel thereby to sense the presence or absence of perforations in a record passing therethrough and retractable from said record channel to permit movement of a record operatively positioned therein, comprising
   means for retracting said elements,
   cyclically operable means,
   means for coupling said cyclically operable means to said retracting means,
   means in said record channel downstream of said record sensing elements for detecting passage of the edge portions of said record,
   auxiliary record drive means adapted to be rendered operative in response to the passage of the terminal edge of a record past said detecting means,
   and means associated with said auxiliary record drive means adapted to maintain said retracting means operative for as long as said auxiliary record drive means is operative,
   said detecting means being responsive to the operative positionment of a new record to disable said record drive means.

3. Apparatus for reading perforated records having data items represented by perforation patterns in parallel columns across the shorter dimension thereof comprising
   a columnar array of sensing pins normally yieldably biased into a record channel through which a record is to be fed columnwise,
   means downstream of said sensing pins operable to incrementally move a record column by column,
   means including control circuitry operative in response to command signals to effect the retraction of said sensing pins and to effect incremental feed of said record while said pins are so retracted,
   normally inoperative record drive means upstream of said sensing pins,
   switch means positioned in said record channel downstream of said sensing pins responsive to passage of the terminal edge of a record passing through said channel,
   and means operative by said switch means for rendering said control circuitry non-responsive to command signals, and said pin retracting means and said auxiliary feed means operative, whereby a new record may be fed into said channel and into operative association with said incremental feed means.

4. Apparatus as recited in claim 3 comprising further switch means upstream of said hereinbefore recited switch means operable by the forward edge of new record fed past said sensing pins by said auxiliary record drive means for rendering said incremental feed means operative, said hereinbefore recited switch means being operable by the forward edge of said new record to disable said incremental and auxiliary feed means and said pin retracting means, and to enable said circuitry to effect read feed cycles again in response to command signals.

5. Apparatus for processing records having data items represented by perforation patterns in parallel columns including index holes in each column,
   continuously cyclically operable drive means,
   means for generating timing signals at the cyclic rate of said drive means,
   record feed mechanism including a sprocketed feed drum engageable with said index holes and operable by said feed mechanism to incrementally move and record columnwise past a processing station, said records having an open index hole in the lead edges thereof,
   feed control means conditionable in response to command signals and responsive to said timing signals for effecting the connection of said drive means and said feed mechanism whereby a record is indexed by said drum relative to a processing station,
   first and second switch means located respectively upstream and downstream of a vertical through said drum, said switch means being operable by a record being processed,
   normally inoperative auxiliary drive means,
   means responsive to the operation of said second switch means upon movement of the trailing edge of a record therepast for blocking subsequent command signals and for enabling said auxiliary record drive means whereby a new record may be driven past said processing station until its lead index hole engages a sprocket on said drum and its lead edge operates said first switch means,
   said operated first switch means conditioning said feed control means for effecting the connection of said cyclically operable drive means to said feed mechanism until said second switch means is operated by the lead edge of the drum indexed record,
   said second switch means being operative to disable said auxiliary record drive means and said feed control means and to enable subsequent command signals to condition said feed control means.

6. Apparatus as recited in claim 5 wherein said auxiliary record drive means comprises a continuously driven roller and a roller mounted for movement relative to said driven roller,
   and wherein said means responsive to the operation of said switch means for enabling said record drive means comprises an electromagnet for effecting the movement of said rollers toward one another whereby a record may be frictionally driven therebetween.

7. Apparatus for reading perforated records having spocket feed holes comprising cyclically operable means,
   means for generating timing signals at the cyclic rate of said drive means,
   a sprocket feed drum,
   pin sensing elements normally biased into a record channel for sensing perforation patterns in a record, means for retracting said pin sensing elements after a sensing interval, means for indexing said feed drum after retraction of said pin sensing elements, control means conditionable by command signals and responsive to said timing signals for effecting the connection of said cyclically operable means with said pin retracting and drum indexing means whereby a record may be indexed after a sensing interval, a normally inoperative auxiliary record drive means, and first and second switch means serially responsive to the movement of the terminal edge of a record from operative engagement with said feed drum for rendering said control means nonresponsive to command signals, for operating said pin retracting means and for enabling said auxiliary drive means whereby a new record having an open index hole in its lead edge may be driven into engagement with said feed drum, said enabled auxiliary drive means being operative to maintain said pin sensing element retracting means operative, said first switch means being operative in response to the lead edge of said new record upon its engagement with said feed drum to condition said control means thereby to effect the connection of said cyclically operable means with said drum indexing means until said second switch means is operated by the leading edge of said new record, said operative second switch means effecting the disabling of said auxiliary feed mechanism and rendering said control means responsive to command signals.

References Cited by the Examiner

UNITED STATES PATENTS

| | | | |
|---|---|---|---|
| 2,819,020 | 1/58 | Baer | 235—61.11 |
| 3,024,077 | 3/62 | Harwood | 246—22 |

MALCOLM A. MORRISON, *Primary Examiner.*